United States Patent
Sun

(10) Patent No.: US 11,262,623 B2
(45) Date of Patent: Mar. 1, 2022

(54) SEALANT, MANUFACTURING METHOD THEREFOR, LIQUID CRYSTAL DISPLAY PANEL AND DISPLAY DEVICE

(71) Applicants: BOE Technology Group Co., Ltd., Beijing (CN); Hefei BOE Optoelectronics Technology Co., Ltd., Anhui (CN)

(72) Inventor: Dongling Sun, Beijing (CN)

(73) Assignees: BOE Technology Group Co., Ltd., Beijing (CN); Hefei BOE Optoelectronics Technology Co., Ltd., Anhui (CN)

( * ) Notice: Subject to any disclaimer, the term of this patent is extended or adjusted under 35 U.S.C. 154(b) by 803 days.

(21) Appl. No.: 16/078,702

(22) PCT Filed: Jan. 17, 2018

(86) PCT No.: PCT/CN2018/073068
§ 371 (c)(1),
(2) Date: Aug. 22, 2018

(87) PCT Pub. No.: WO2019/015281
PCT Pub. Date: Jan. 24, 2019

(65) Prior Publication Data
US 2021/0278714 A1 Sep. 9, 2021

(30) Foreign Application Priority Data
Jul. 21, 2017 (CN) .......................... 201710602920.4

(51) Int. Cl.
*G02F 1/1339* (2006.01)
*G02F 1/1335* (2006.01)
*G02F 1/13357* (2006.01)

(52) U.S. Cl.
CPC ...... *G02F 1/1339* (2013.01); *G02F 1/133514* (2013.01); *G02F 1/133617* (2013.01)

(58) Field of Classification Search
None
See application file for complete search history.

(56) References Cited

U.S. PATENT DOCUMENTS

2010/0213816 A1\* 8/2010 Saruta .................. C09K 11/025
313/483
2011/0042704 A1\* 2/2011 Kim ................... C09K 11/7733
257/98

(Continued)

FOREIGN PATENT DOCUMENTS

| CN | 104673106 A | 6/2015 | |
| CN | 104793408 A * | 7/2015 | G02F 1/133504 |

(Continued)

OTHER PUBLICATIONS

English translation of CN-104793408-A, Title: Display panel and display device, Author: Zhang Bo; Tan Cong; Zhan Chengyong; Li Fangfang; Wang Kai; Date of publication: Jul. 22, 2015 (Year: 2015).\*

(Continued)

*Primary Examiner* — Shan Liu
(74) *Attorney, Agent, or Firm* — Banner & Witcoff, Ltd.

(57) ABSTRACT

A sealant, a manufacturing method therefor, a liquid crystal display (LCD) panel and a display device are provided. The sealant includes a sealant matrix and luminescent particulates distributed in the sealant matrix. The luminescent particulates at least emit ultraviolet (UV) light under UV irradiation.

6 Claims, 2 Drawing Sheets

(56) References Cited

U.S. PATENT DOCUMENTS

| | | |
|---|---|---|
| 2016/0370611 A1 | 12/2016 | Jiang et al. |
| 2017/0139244 A1 | 5/2017 | Zhang et al. |
| 2018/0017817 A1 | 1/2018 | Ren et al. |

FOREIGN PATENT DOCUMENTS

| | | |
|---|---|---|
| CN | 104793408 A | 7/2015 |
| CN | 104880864 A | 9/2015 |
| CN | 105116629 A | 12/2015 |
| CN | 107203072 A | 9/2017 |
| JP | 2012053203 A | 3/2012 |

OTHER PUBLICATIONS

丁旭, 摘要: 近紫外光激发的（氯）硼酸盐发光 材料的研究 (Abstract of Study on (Chlorine) Borate Luminescent Materials Excited by Near Ultraviolet Light; Author: Ding Xu, Date of publication: Jan. 1, 2011) (Year: 2011).*

Abstract of Synthesis and spectral analysis of novel yellowish-green emitting phosphors Sr2MgSi3O9 :Tb3+,Ce3+; Author: Zhai Yong-qing, Feng Shi-hua, Li Yan-wei, An Ran, Date of publication: 2009 (Year: 2009).*

Title: Double emittingphosphorNaSr4(BO3)3:Ce3+, Tb3+ for near-UV light-emitting diodes; Author: Chongfeng Guo, XuDing, HyoJinSeo, ZhaoyuRen, JintaoBai, Date: Apr. 2011, Publisher: Optics & Laser Technology, Edition or vol. 43(2011), p. 1351-1354 (Year: 2011).*

Title: On the Luminescence of Ce3+, Eu3+, and Tb3+ in Novel Borate LiSr4(BO3)3; Author: Xinmin Zhang & Haiyan Lang & Hyo Jin Seo, Date: Dec. 2010, Publisher: J Fluoresc, Edition or vol. (2011) 21, p. 1111-1115 (Year: 2010).*

Apr. 24, 2018—(WO) International Search Report and Written OpinionAppn PCT/CN2018/073068 with English Translation.

* cited by examiner

SEALANT, MANUFACTURING METHOD THEREFOR, LIQUID CRYSTAL DISPLAY PANEL AND DISPLAY DEVICE

CROSS REFERENCE TO RELATED APPLICATIONS

The application is a U.S. National Phase Entry of International Application No. PCT/CN2018/073068 filed on Jan. 17, 2018, designating the United States of America and claiming priority to Chinese Patent Application No. 201710602920.4 filed on Jul. 21, 2017. The present application claims priority to and the benefit of the above-identified applications and the above-identified applications are incorporated by reference herein in their entirety.

TECHNICAL FIELD

Embodiments of the present disclosure relate to a sealant, a manufacturing method therefor, a liquid crystal display (LCD) panel and a display device.

BACKGROUND

Thin-film transistor-liquid crystal display (TFT-LCD) panel is a display device having the advantages of wide size range, low energy consumption and low radiation and is mainly composed of an array substrate, a color filter (CF) substrate and a liquid crystal layer filled between the array substrate and the CF substrate.

Cell-assembly process plays an important role in the manufacturing process of the TFT-LCD. In the cell-assembly process, sealant is adopted to well bond together the array substrate and the CF substrate to form a liquid crystal cell for accommodating liquid crystal molecules in the liquid crystal layer. The curing effect of the sealant is particularly important for the quality of the cell.

SUMMARY

Embodiments of the present disclosure provides a sealant, a manufacturing method therefor, a liquid crystal display (LCD) panel and a display device.

A sealant provided by an embodiment of the present disclosure, comprising: a sealant matrix; and luminescent particulates distributed in the sealant matrix. The luminescent particulates are configured to at least emit ultraviolet (UV) light under UV irradiation.

In a possile implemantation, in the sealant of the embodiment of the present disclosure, material of the luminescent particulates is any one selected from $Sr_2MgSi_3O_9:Ce^{3+}$, $Tb^{3+}$, $Sr_2B_5O_9Cl:Ce^{3+}$, $LiSr_4(BO_3)_3:Tb^{3+}$ or $NaSr_4(BO_3)_3:Tb^{3+}$.

In a possile implemantation, in the sealant of the embodiment of the present disclosure, at least one protective layer is formed on surfaces of the luminescent particulates.

In a possile implemantation, in the sealant of the embodiment of the present disclosure, material of the protective layer is any one selected from $SiO_2$ and/or $Al_2O_3$.

Embodiments of the present disclosure also provides a liquid crystal display (LCD) panel, comprising: an array substrate and a color filter (CF) substrate which are oppositely arranged, and the sealant for sealing the array substrate and the CF substrate into a liquid crystal cell.

Embodiments of the present disclosure also provides a display device, comprising the liquid crystal display (LCD) panel.

Embodiments of the present disclosure also provides a method for manufacturing a sealant, comprising: providing luminescent particulates and a sealant matrix; and forming the sealant by mixing and stirring the luminescent particulates and the sealant matrix, in which the luminescent particulates at least emit UV light under UV irradiation.

In a possile implemantation, in the method of the embodiment of the present disclosure, obtaining a mixed solution by adding $SrCO_3$, $MgO$, $H_2SiO_3$ and $Ce(NO_3)_3$ into a $TbCl_3$ solution according to a molar ratio of 2:1:3:1; obtaining a mixture by adding a sintering aid into the mixed solution and drying the mixed solution at a constant temperature after stirring; performing high-temperature calcination after grinding the mixture; and obtaining the luminescent particulates of $Sr_2MgSi_3O_9:Ce^{3+}$, $Tb^{3+}$ material by grinding the mixture obtained after the high-temperature calcination.

In a possile implemantation, in the method of the embodiment of the present disclosure, obtaining a mixed solution by adding $Li_2CO_3$, $SrCO_3$ and $H_2BO_3$ into a $TbCl_3$ solution according to a molar ratio of 1:8:6; obtaining a mixture by adding a sintering aid into the mixed solution and drying the mixed solution at a constant temperature after stirring; performing high-temperature calcination after grinding the mixture; and obtaining the luminescent particulates of $LiSr_4(BO_3)_3:Tb^{3+}$ material by grinding the mixture obtained after the high-temperature calcination.

In a possile implemantation, in the method of the embodiment of the present disclosure, obtaining a mixed solution by adding $Na_2CO_3$, $SrCO_3$ and $H_2BO_3$ into a $TbCl_3$ solution according to a molar ratio of 1:8:6; obtaining a mixture by adding a sintering aid into the mixed solution and drying the mixed solution at a constant temperature after stirring; performing high-temperature calcination after grinding the mixture; and obtaining the luminescent particulates of $NaSr_4(BO_3)_3:Tb^{3+}$ material by grinding the mixture obtained after the high-temperature calcination.

In a possile implemantation, in the method of the embodiment of the present disclosure, obtaining a mixed solution by adding $SrCO_3$, $SrCl_2.6H_2O$ and $H_3BO_3$ into a $Ce_2(SO_4)_3$ solution according to a molar ratio of 1:1:5; obtaining a mixture by adding a sintering aid into the mixed solution and drying the mixed solution at a constant temperature after stirring; performing high-temperature calcination after grinding the mixture; and obtaining the luminescent particulates of $Sr_2B_5O_9Cl:Ce^{3+}$ material by grinding the mixture obtained after the high-temperature calcination.

In a possile implemantation, in the method of the embodiment of the present disclosure, forming a protective layer on the surfaces of the luminescent particulates after providing the luminescent particulates and before mixing and stirring the luminescent particulates and the sealant matrix.

In a possile implemantation, in the method of the embodiment of the present disclosure, obtaining a preliminary mixed solution by adding the luminescent particulates and $Al_2O_3$ and/or $SiO_2$ into alcohol; and heating to burn the preliminary mixed solution after adding an incendiary agent into the preliminary mixed solution, and forming a $Al_2O_3$ protective layer and/or a $SiO_2$ protective layer on the surfaces of the luminescent particulates.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

Technical solutions of the embodiments will be described in a clearly and fully understandable way in connection with the drawings related to the embodiments of the present disclosure. It is apparent that the described embodiments are just a part but not all of the embodiments of the present disclosure. Based on the described embodiments herein, one of ordinary skill in the art can obtain other embodiment(s), without any creative work, which shall be within the scope of the present disclosure.

The shape or size of film layers in the accompanying drawings do not reflect true scale of the sealant or the LCD panel and are only intended to illustrate the content of the present disclosure.

The inventor has noted that: in the process of curing the sealant by UV light, as the sealant is opaque, a phenomenon that the surface of the sealant has been completely cured but the inside of the sealant is not cured or not completely cured will occur, resulting in poor curing uniformity and uneven curing of the sealant. And these phenomena will result in defects, such as leakage, bubbles and liquid crystal pollution. In order to completely cure the surface and the inside of the sealant to improve the curing uniformity of the sealant, the sealant must be subjected to a long-term UV irradiation. In this way, the curing efficiency of UV light on the sealant is reduced, the production cycle is increased, and the productivity is affected.

Figure 1:
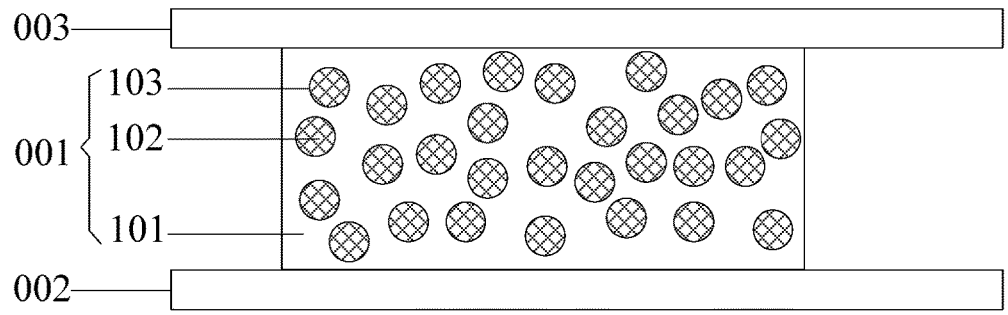
FIG. 1 is a schematically sectional view illustrating the position of sealant after cell-assembly in an embodiment of the present disclosure.

As shown in FIG. 1, an embodiment of the present disclosure provides a sealant 001, which comprises: a sealant matrix 101 and luminescent particulates 102 distributed in the sealant matrix 101.

The luminescent particulates 102 at least emit UV light under UV irradiation.

In the sealant 001 provided by the embodiment of the present disclosure, as the luminescent particulates 102 are disposed within the sealant matrix 101, the UV light emitted by the luminescent particulates 102 under the action of UV light can preferentially cure the inside part of the sealant matrix 101; and the UV light for exciting the luminescent particulates 102 to emit light can preferentially cure the surface of the sealant matrix 101, so the curing uniformity of the sealant 001 is effectively improved. Moreover, as two-way curing can be simultaneously performed on the inside part and the surface of the sealant matrix 101, the time for the complete curing of the sealant 001 is decreased. In this way, the curing efficiency is improved while the curing uniformity of the sealant 001 is improved.

It is noted that, in the sealant 001 provided by the embodiment of the present disclosure, the luminescent particulates 102 can emit UV light and can emit light outside the UV spectrum, for example, visible light, under the excitation of the UV light. As only the UV light has the function of curing the sealant matrix 101, for instance, in order to more effectively improve the curing uniformity and the curing efficiency, in the sealant 001 provided by the embodiment of the present disclosure, the luminescent particulates 102 may be controlled to only emit UV light under UV irradiation.

Moreover, in the sealant 001 provided by the embodiment of the present disclosure, the distribution situation of the luminescent particulates 102 in the sealant matrix 101 has an important effect on the curing uniformity and the curing efficiency. In the sealant 001 provided by the embodiment of the present disclosure, the luminescent particulates 102 should be distributed as evenly as possible in the sealant matrix 101, so that the UV light emitted by the luminescent particulates 102 under the excitation of UV light can uniformly cure the sealant matrix 101. In addition, in the sealant 001 provided by the embodiment of the present disclosure, the mass fraction of the sealant matrix 101 to the luminescent particulates 102 should be selected as required; and after the luminescent particulates 102 are doped into the sealant matrix 101, on the premise of not affecting the fluidity and the adhesive property of the sealant matrix 101, the more the luminescent particulates 102 are doped, the better the sealant is. For instance, the doped luminescent particulates 102 account for 0.5%-1.5% (mass ratio) of a mixture, e.g., 1% (mass ratio), however, the embodiment of the present disclosure is not limited thereto. Moreover, the size of the luminescent particulate 102 is relevant to the preparation process. The actual size may refer to parameters, such as the cell gap of a display product. For instance, the size of the luminescent particulate 102 is 1.0-5.0 μm, however, the embodiment of the present disclosure is not limited thereto.

For instance, as the luminescent particulates 102 emit the UV light under UV irradiation, in the sealant 001 provided by the embodiment of the present disclosure, the selection of the material of the luminescent particulates 102 may be at least one material, that is to say, materials of a plurality of luminescent particulates 102 distributed in the sealant matrix 101 may be same or different. Moreover, when the materials of all the luminescent particulates 102 are same or different, the luminescent spectrum of all the luminescent particulates 102 may completely cover the UV spectrum, or may only cover partial UV spectrum. For instance, all the luminescent particulates 102 may be made from luminescent material(s) having an excitation spectrum in a range of 100 nm to 400 nm, and an emission spectrum in a range of 100 nm to 400 nm or slightly larger than the range.

Moreover, for instance, in the sealant 001 provided by the embodiment of the present disclosure, when the materials of the luminescent particulates 102 are the same, the material of the luminescent particulate 102 may be $Sr_2MgSi_3O_9$:$Ce^{3+}$, $Tb^{3+}$, $Sr_2B_5O_9Cl$:$Ce^{3+}$, $LiSr_4(BO_3)_3$:$Tb^{3+}$, or $NaSr_4(BO_3)_3$:$Tb^{3+}$, in which the excitation peak of $Sr_2MgSi_3O_9$:$Ce^{3+}$, $Tb^{3+}$ is about 249 nm, and the emission peak is about 400 nm, however, the embodiment of the present disclosure is not limited thereto. For instance, the materials of the luminescent particulates 102 may also be other materials capable of emitting UV light known in the art.

Figure 2:
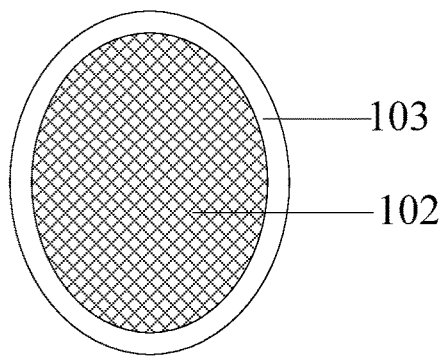
FIG. 2 is a schematically structural view of luminescent particles in an embodiment of the present disclosure.

The luminescent particulates 102 may emit UV light by absorbing light in the UV spectrum to produce energy level transition, to achieve the curing effect of the sealant matrix 101 from inside to outside. However, as the luminescent particulates 102 are particularly sensitive to water and oxygen, once the luminescent particulates are exposed to water and oxygen, the luminescence of the luminescent particulates 102 will be reduced and even eliminated, so the curing function on the sealant 101 can be eliminated. To improve the stability of the luminescent particulates 102, for instance, in the sealant 001 provided by the embodiment of the present disclosure, as shown in FIGS. 1 and 2, at least one protective layer 103 may be formed on the surfaces of the luminescent particulates 102. In this way, the surfaces of the luminescent particulates 102 are coated to isolate water and oxygen, so as to avoid water and oxygen from eroding the luminescent particulates 102. In this way, the luminescent particulates 102 can maintain the curing function for a long time.

Moreover, for instance, in the sealant 001 provided by the embodiment of the present disclosure, material of the protective layer 103 may adopt material with strong water resistance and corrosion resistance. For instance, $SiO_2$ may be adopted to coat the surfaces of the luminescent particulates 102; or $Al_2O_3$ may be adopted to coat the surfaces of the luminescent particulates 102; or $SiO_2$ and $Al_2O_3$ may be simultaneously adopted to coat the surfaces of the luminescent particulates 102. The embodiment of the present disclosure is not limited thereto. For instance, other materials may also be adopted.

For instance, in the sealant 001 provided by the embodiment of the present disclosure, the sealant matrix 101 is a conventional sealant and includes: light-cured resins, thermosetting resins, a photoinitiator, a heat curing agent, organic filler and a coupling agent. In addition, gold sphere particulates or the like may also be doped into the sealant matrix 101 according to the situation, however, the embodiment of the present disclosure is not limited thereto.

Correspondingly, an embodiment of the present disclosure provides a method for preparing a sealant. As the principle of the preparation method in solving problems is similar to the principle of the sealant in solving problems, the implementation of the preparation method provided by the embodiment of the present disclosure may refer to the implementation of the sealant provided by the embodiment of the present disclosure. No further detail will be given for the repeated description here.

Figure 3:
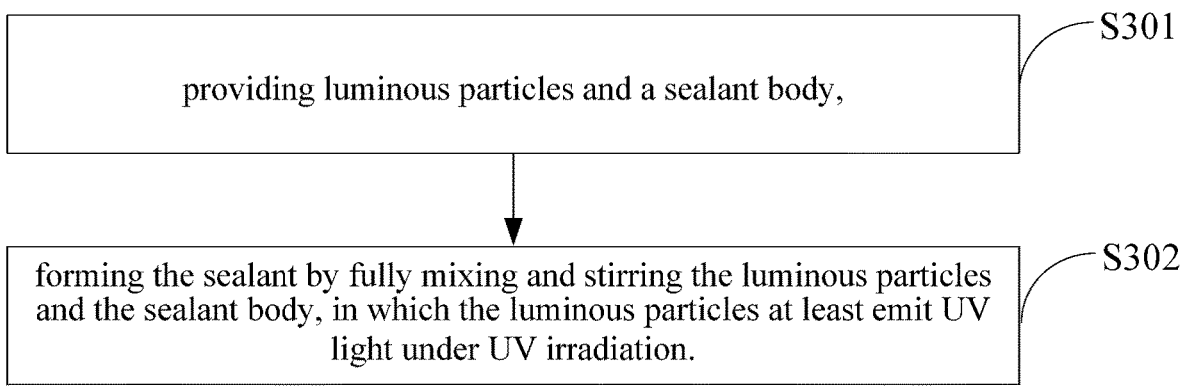
FIGS. 3 and 4 are flowcharts of a method for preparing a sealant, provided by embodiments of the present disclosure, respectively.

For instance, as shown in FIG. 3, the method for preparing the sealant, provided by the embodiment of the present disclosure, may comprise the following operations.

S301: providing luminescent particulates and a sealant matrix.

S302: forming the sealant by fully mixing and stirring the luminescent particulates and the sealant matrix, in which the luminescent particulates at least emit UV light under UV irradiation. For instance, the luminescent particulates and the sealant matrix are stirred and mixed for 50 minutes at the rotating speed of 200 rev/sec by utilization of a mixer.

For instance, in the manufacturing method provided by the embodiment of the present disclosure, after the luminescent particulates and the sealant matrix are fully and uniformly mixed and stirred in the step S302, the mixture of the luminescent particulates and the sealant matrix obtained after stirring may also be defoamed.

For instance, in the manufacturing method provided by the embodiment of the present disclosure, according to different materials of the luminescent particulates, the step of providing the luminescent particulates in the step S301 may be implemented by any of the following ways.

For instance, a mixed solution is obtained by adding $SrCO_3$, $MgO$, $H_2SiO_3$ and $Ce(NO_3)_3$ into a $TbCl_3$ solution according to a molar ratio of 2:1:3:1; a mixture is obtained by adding a sintering aid into the mixed solution and drying the mixed solution at a constant temperature after fully stirring; the mixture is fully ground and then calcined at a high temperature; and luminescent particulates of $Sr_2MgSi_3O_9:Ce^{3+}$, $Tb^{3+}$ material are obtained by fully grinding the mixture obtained after high-temperature calcination.

For instance, a mixed solution is obtained by adding $SrCO_3$, $Li_2CO_3$ and $H_3BO_3$ into a $TbCl_3$ solution according to a molar ratio of 8:1:6; a mixture is obtained by adding a sintering aid into the mixed solution and drying the mixed solution at a constant temperature after fully stirring; the mixture is fully ground and then calcined at a high temperature; and luminescent particulates of $LiSr_4(BO_3)_3:Tb^{3+}$ material are obtained by fully grinding the mixture obtained after high-temperature calcination.

For instance, a mixed solution is obtained by adding $SrCO_3$, $Na_2CO_3$ and $H_3BO_3$ into a $TbCl_3$ solution according to a molar ratio of 8:1:6; a mixture is obtained by adding a sintering aid into the mixed solution and drying the mixed solution at a constant temperature after fully stirring; the mixture is fully ground and then calcined at a high temperature; and luminescent particulates of $NaSr_4(BO_3)_3:Tb^{3+}$ material are obtained by fully grinding the mixture obtained after high-temperature calcination.

For instance, a mixed solution is obtained by adding $SrCO_3$, $SrCl_2 \cdot 6H_2O$ and $H_3BO_3$ into a $Ce_2(SO_4)_3$ solution according to a molar ratio of 1:1:5, in which the molar ratio of $Ce^{+3}$ may be selected from a range of 0.003-0.03, e.g., 0.008 (the molar ratio with respect to Mg); a mixture is obtained by adding a sintering aid into the mixed solution and drying the mixed solution at a constant temperature after fully stirring; the mixture is fully ground and then calcined at a high temperature; and luminescent particulates of $Sr_2B_5O_9Cl:Ce^{3+}$ material are obtained by fully grinding the mixture obtained after high-temperature calcination.

The embodiment of the present disclosure is not limited to the above examples. The luminescent particulates may also be prepared by other materials and processes.

Figure 4:
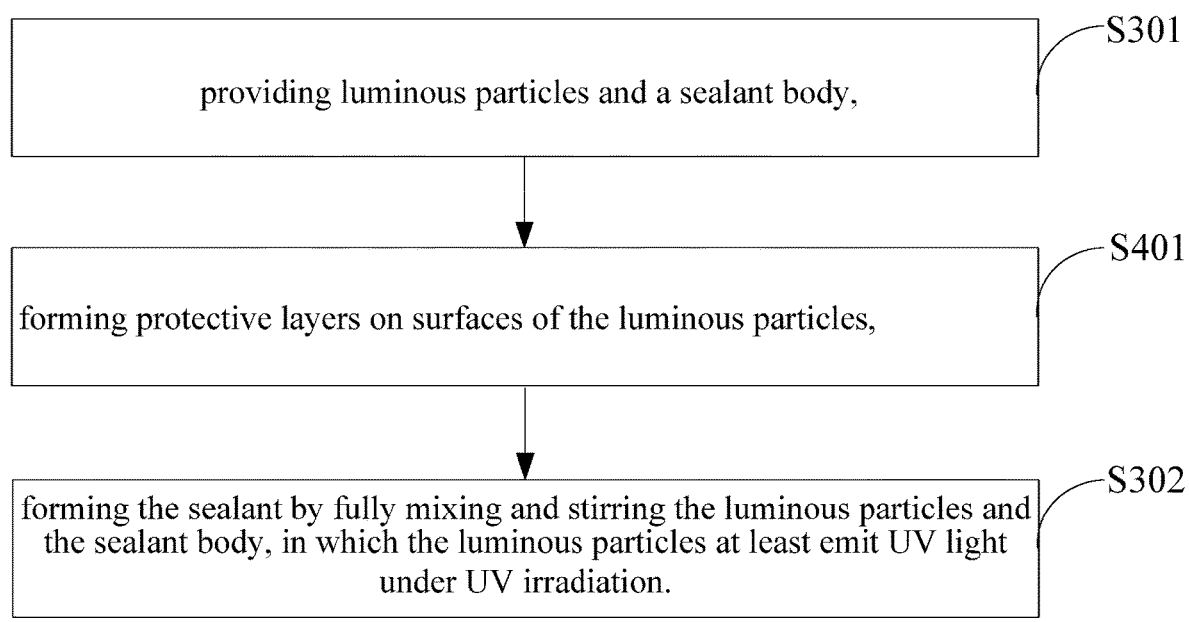

Moreover, for instance, in order to improve the stability of the luminescent particulates, after the step of providing the luminescent particulates in the step S301 and before the step of fully mixing and stirring the luminescent particulates and the sealant matrix in the step S302, as shown in FIG. 4, the manufacturing method provided by the embodiment of the present disclosure may further comprise the following operation: S401: forming protective layers on surfaces of the luminescent particulates.

For instance, in the manufacturing method provided by the embodiment of the present disclosure, the step of forming the protective layers on the surfaces of the luminescent particulates in the step S401 may be implemented by the following process: obtaining a preliminary mixed solution by adding the luminescent particulates and $Al_2O_3$ and/or $SiO_2$ into alcohol; and heating to burn the preliminary mixed solution after adding an incendiary agent into the preliminary mixed solution, and forming a $Al_2O_3$ protective layer and/or a $SiO_2$ protective layer on the surfaces of the luminescent particulates.

The embodiment of the present disclosure is not limited thereto. The protective layer(s) may also be formed on the surfaces of the luminescent particulates by other process.

An example will be given below for better understanding of the manufacturing method provided by the embodiment of the present disclosure: respectively weighing 2 parts of $SrCO_3$, 1 part of $MgO$, 3 parts of $H_2SiO_3$ and 1 part of $Ce(NO_3)_3$ according to the stoichiometric ratio of elements in the chemical formula $Sr_2MgSi_3O_9:Ce^{3+}$, $Tb^{3+}$; preparing a $TbCl_3$ solution with the concentration of 0.1 mol/L by dissolving $Tb_4O_7$ in a hydrochloric acid; placing the weighed materials $SrCO_3$, $MgO$, $H_2SiO_3$ and $Ce(NO_3)_3$ and the prepared TbCl$_3$ solution in an evaporating dish, in which the molar ratio of Tb$^{3+}$ may be 0.01-0.06, preferably 0.03 (the molar ratio with respect to Mg); adding a sintering aid (e.g., boric acid or lithium nitrate), uniformly stirring the mixed solution, placing the mixed solution in a thermostat drying oven, and drying the mixed solution at temperature 85° C.; placing the dried mixture in a mortar box for fully grinding, moving the mixture into a crucible, and placing the mixture in a high-temperature chamber furnace for calcining for 8 hours at the temperature of 1,100° C.; cooling and taking out the mixture obtained after calcination, uniformly grinding the mixture, and obtaining the luminescent particulates of Sr$_2$MgSi$_3$O$_9$:Ce$^{3+}$, Tb$^{3+}$ material.

Placing the prepared luminescent particulates and Al$_2$O$_3$ or SiO$_2$ in alcohol for uniform mixing; placing the mixed solution obtained after uniformly mixing in a crucible, adding a dilute nitric acid or other incendiary agents, heating to burn the mixed solution, and obtaining luminescent particulates coated with Al$_2$O$_3$ or SiO$_2$ Obtaining the sealant by doping the luminescent particulates having the Al$_2$O$_3$ protective layer or the SiO$_2$ protective layer into the sealant matrix and performing a defoaming process after fully mixing and stirring.

It should be noted that the parameters in the examples provided by the embodiment of the present disclosure are merely exemplary, and the present disclosure is not intended to be limited to these parameters, and other parameters may be set by those skilled in the art according to actual demands.

Based on the same concept, an embodiment of the present disclosure also provides a liquid crystal display (LCD) panel, which, as shown in FIG. 1, comprises: an array substrate 002 and a color filter (CF) substrate 003 which are oppositely arranged, and the sealant 001 for sealing the array substrate 002 and the CF substrate 003 into a liquid crystal cell. The LCD panel may be a twisted nematic (TN) LCD panel, an advanced super dimension switch (ADS) LCD panel, a high aperture ratio-advanced super dimension switch (HADS) LCD panel, or an in-plane switch (IPS) LCD panel, however, embodiment of the present disclosure is not limited to the LCD panels of the above types. The implementation of the LCD panel may refer to the embodiments of the sealant. No further description will be repeated here.

Based on the same concept, an embodiment of the present disclosure also provides a display device, which comprises the liquid crystal display (LCD) panel provided by the embodiment of the present disclosure. The display device may be any product or component with display function, such as a mobile phone, a tablet PC, a TV, a display, a notebook computer, a digital album, a navigator, a smart watch, a fitness wristband or a personal digital assistant (PDA). The implementation of the display device may refer to the embodiments of the LCD panel. No further description will be repeated here.

The embodiments of the present disclosure provide the sealant, the manufacturing method therefor, the LCD panel and the display device. The sealant comprises: a sealant matrix and luminescent particulates distributed in the sealant matrix, in which the luminescent particulates at least emit UV light under UV irradiation. As the luminescent particulates are disposed within the sealant matrix, the UV light emitted by the luminescent particulates under the action of UV light can preferentially cure the inside part of the sealant matrix; and the UV light for exciting the luminescent particulates to emit light can preferentially cure the surface of the sealant matrix, so the curing uniformity of the sealant can be effectively improved. Moreover, as two-way curing can be simultaneously performed in the inside part and the surface of the sealant matrix, the time for the complete curing of the sealant is decreased, so the curing efficiency is improved while the curing uniformity of the sealant is improved.

The described above are only exemplary embodiments of the present disclosure, and the present disclosure is not intended to be limited thereto. Improvements and modifications can be made without departing from the spirit and principle of the present disclosure, and all of these improvements and modifications shall fall within the scope of the present disclosure.

What is claimed is:

1. A method for preparing a sealant, comprising:
providing a sealant matrix;
obtaining a mixed solution by adding SrCO$_3$, MgO, H$_2$SiO$_3$ and Ce(NO$_3$)$_3$ into a TbCl$_3$ solution according to a molar ratio of 2:1:3:1;
obtaining a mixture by adding a sintering aid into the mixed solution and drying the mixed solution at a constant temperature after stirring;
performing high-temperature calcination after grinding the mixture;
obtaining luminescent particulates of Sr$_2$MgSi$_3$O$_9$:Ce$^{3+}$, Tb$^{3+}$ material by grinding the mixture obtained after the high-temperature calcination; and
forming the sealant by mixing and stirring the luminescent particulates and the sealant matrix, in which the luminescent particulates at least emit UV light under UV irradiation.

2. The method according to claim 1, further comprising:
obtaining a second mixed solution by adding SrCO$_3$, SrCl$_2$.6H$_2$O and H$_3$BO$_3$ into a Ce$_2$(SO$_4$)$_3$ solution according to a molar ratio of 1:1:5;
obtaining a second mixture by adding a sintering aid into the second mixed solution and drying the second mixed solution at a constant temperature after stirring;
performing high-temperature calcination after grinding the second mixture; and
obtaining luminescent particulates of Sr$_2$B$_5$O$_9$Cl:Ce$^{3+}$ material by grinding the second mixture obtained after the performing the high-temperature calcination.

3. The method according to claim 1, further comprising: before the forming the sealant by mixing and stirring the luminescent particulates and the sealant matrix, forming a protective layer on surfaces of the luminescent particulates.

4. The method according to claim 3, wherein the forming the protective layer on the surfaces of the luminescent particulates comprises:
obtaining a preliminary mixed solution by adding the luminescent particulates and Al$_2$O$_3$ and/or SiO$_2$ into alcohol; and
heating to burn the preliminary mixed solution after adding an incendiary agent into the preliminary mixed solution, and forming an Al$_2$O$_3$ protective layer and/or a SiO$_2$ protective layer on the surfaces of the luminescent particulates.

5. A method for preparing a sealant comprising:
providing a sealant matrix;
obtaining a mixed solution by adding Li$_2$CO$_3$, SrCO$_3$ and H$_2$BO$_3$ into a TbCl$_3$ solution according to a molar ratio of 1:8:6;
obtaining a mixture by adding a sintering aid into the mixed solution and drying the mixed solution at a constant temperature after stirring;
performing high-temperature calcination after grinding the mixture;

obtaining luminescent particulates of $LiSr_4(BO_3)_3:Tb^{3+}$ material by grinding the mixture obtained after the performing the high-temperature calcination; and forming the sealant by mixing and stirring the luminescent particulates and the sealant matrix, in which the luminescent particulates at least emit UV light under UV irradiation.

6. A method for preparing a sealant comprising:

providing a sealant matrix;

obtaining a mixed solution by adding $Na_2CO_3$, $SrCO_3$ and $H_2BO_3$ into a $TbCl_3$ solution according to a molar ratio of 1:8:6;

obtaining a mixture by adding a sintering aid into the mixed solution and drying the mixed solution at a constant temperature after stirring;

performing high-temperature calcination after grinding the mixture;

obtaining luminescent particulates of $NaSr_4(BO_3)_3:Tb^{3+}$ material by grinding the mixture obtained after the performing the high-temperature calcination; and forming the sealant by mixing and stirring the luminescent particulates and the sealant matrix, in which the luminescent particulates at least emit UV light under UV irradiation.

* * * * *